United States Patent

Mazziotti et al.

[11] Patent Number: 5,407,387
[45] Date of Patent: Apr. 18, 1995

[54] UNIVERSAL JOINT SEAL

[75] Inventors: Philip J. Mazziotti, Toledo; Gary L. March, Defiance, both of Ohio

[73] Assignee: The Zeller Corporation, Defiance, Ohio

[21] Appl. No.: 16,953

[22] Filed: Feb. 12, 1993

[51] Int. Cl.⁶ .............................................. F16D 3/41
[52] U.S. Cl. ................................. 464/131; 277/178; 277/207 R; 464/14
[58] Field of Search ............... 464/130, 131, 128, 11, 464/14; 277/167.5, 178, 168, 207 R, 209, 211

[56] References Cited

U.S. PATENT DOCUMENTS

| | | | |
|---|---|---|---|
| 3,074,255 | 1/1963 | Reinecke | 464/131 X |
| 3,906,746 | 9/1975 | Haines | 464/131 |
| 4,077,235 | 3/1978 | Kleinschmidt et al. | 464/131 |
| 4,440,401 | 4/1984 | Olschewski et al. | 464/131 X |
| 4,505,689 | 3/1985 | Mazziotti | 464/130 |
| 4,512,672 | 3/1985 | Olschewski et al. | 464/131 X |
| 4,515,574 | 5/1985 | Mazziotti | 464/131 |
| 4,530,675 | 7/1985 | Mazziotti | 464/131 |
| 4,576,382 | 3/1986 | Scharting et al. | 464/131 X |
| 4,645,474 | 2/1987 | Olschewski et al. | 464/131 |
| 4,834,691 | 5/1989 | Schultze et al. | 464/131 |

Primary Examiner—Daniel P. Stodola
Assistant Examiner—Eileen A. Dunn
Attorney, Agent, or Firm—Allen D. Gutchess, Jr.

[57] ABSTRACT

A universal joint has a primary seal and a secondary seal. The universal joint includes a cross and a bearing cup with the cross having a body and a trunnion and an annular shoulder with an adjacent surface of circular cross section at the juncture of the body and the trunnion. The open end of the cup has at least one leg extending outwardly therefrom. The primary seal comprises a resilient sealing member having spaced lips engaging the cup and the cross. The secondary seal is spaced outwardly from the primary seal and has a ring with a leg extending outwardly therefrom. The leg of the secondary seal is in overlapping relationship with the leg of the cup. The ring has a tight fit with the adjacent surface of the cross body, with a top of the ring engaging the shoulder of the cross. The secondary seal is spaced slightly from the cup to enable lubricant flushed past the primary seal to escape.

14 Claims, 2 Drawing Sheets

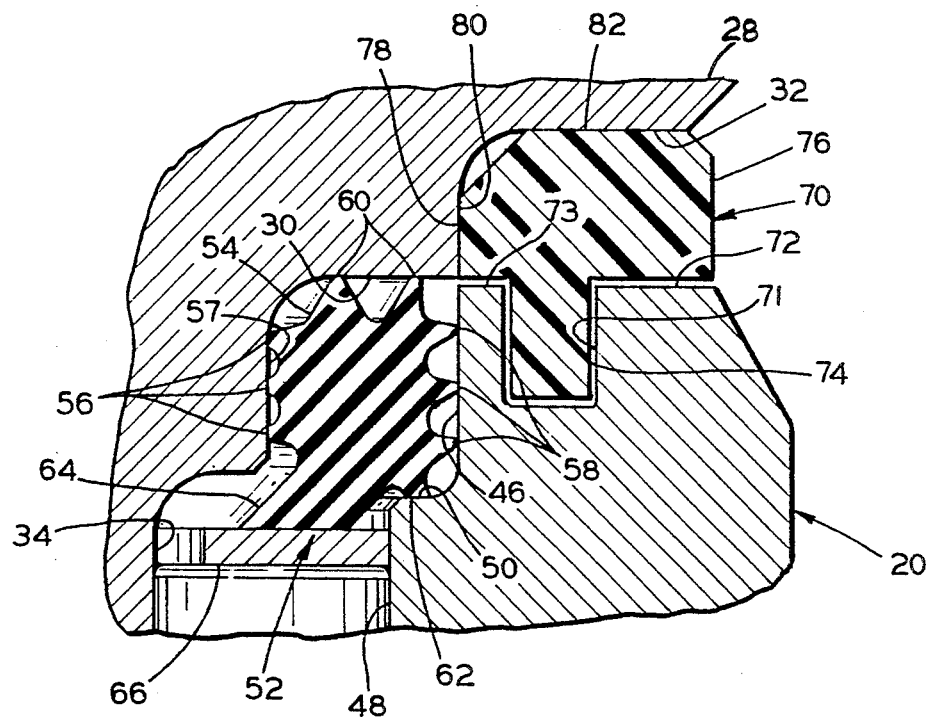
FIG. 4
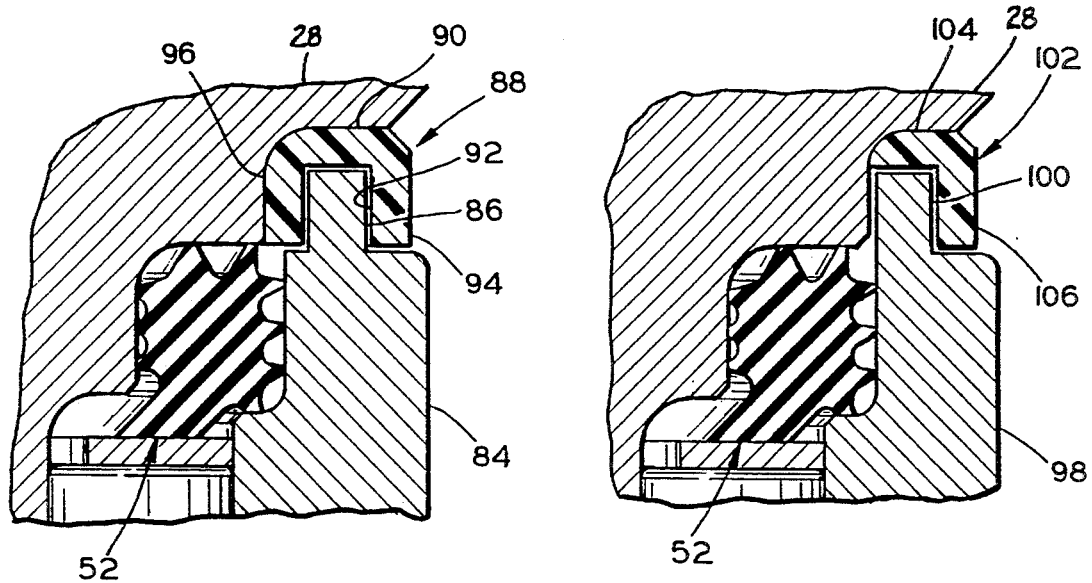
FIG. 5
FIG. 6

UNIVERSAL JOINT SEAL

This invention relates to a combination universal joint seal which is more effective to retain lubricant and to prevent the ingress of water and other contaminants.

Seals between crosses and bearing cups of universal joints must meet difficult conditions. Since there is relative rotational movement between the cross trunnions and the bearing cups, the seals have to provide the sealing function while encountering movement between the seals and the sealing surfaces of the cross and/or cups. The seals must also contain the lubricant for needle bearings in the cups between the inner surface thereof and the trunnions even during high rotational movement of the universal joint and when subjected to torque during operation of the drive train in which the universal joint is located. At the same time, however, with universal joints having lubricant fittings so that the bearings can be periodically lubricated, the seals must enable some of the old lubricant to be flushed from the bearings during lubrication. In addition, the universal joint seals must be effective in preventing the ingress of water and other contaminants which can quickly cause bearing failure, even in small amounts.

The present invention provides an improved combination universal joint seal having a primary seal and a secondary seal. The cross of the universal joint includes a body and four trunnions extending therefrom at mutually perpendicular angles, with the cross having annular shoulders at the juncture of the body and each trunnion. Each bearing cup of the universal joint with which the primary seal is used has an open end which receives one of the trunnions. The cup has a first cylindrical interior portion of one diameter adjacent the open end and a second cylindrical interior portion of a smaller diameter away from the open end, forming an annular internal shoulder between the portions and facing toward the open end. The edge of the open end of the cup also has an outwardly facing annular groove.

The primary universal joint seal preferably includes a resilient sealing member or ring having multiple lips engaging the first cylindrical interior portion of the cup and also having multiple lips engaging the surface of the trunnion adjacent the cross body. The sealing member has an additional lip between the two sets of multiple lips engaging the internal shoulder of the cup and a second additional lip or ridge between the two sets of multiple lips engaging a relatively smooth shoulder of the body of the cross adjacent the trunnion. The multiple lips engaging the trunnion are effective to prevent the ingress of water and contaminants and the outer set of lips engaging the first cylindrical interior portion of the cup also enable the egress of lubricant from the cup during lubrication. This enables dirty lubricant to be flushed completely from the bearing cup if desired. A seal of this type is shown in U.S. Pat. No. 4,530,675, issued Jul. 23, 1985. Also, combination seals of sorts are shown in U.S. Pat. Nos. 4,312,547, issued Jan. 26, 1982, and 4,834,691, issued May 30, 1989.

Primary universal joint seals are commonly used alone and, as such, are subject to contaminants such as dirt, dust, grime, and water even when they are mostly concealed as in the one discussed above. In accordance with the present invention, a secondary seal is located around the primary seal but is spaced therefrom to enable the primary seal to float and accommodate dimensional variations in the cups and trunnions. In one form, the secondary seal in accordance with the invention is of generally T-shaped configuration in transverse cross section. It has an annular tang or leg which is received in the annular groove in the open end of the cup and a cross bar or ring which engages the body of the cross between the two shoulders. This is a relatively tight fit so that the secondary seal is stationary relative to the cross body and the cup moves relative to the secondary seal. The top of the ring of the secondary seal also contacts the second shoulder near the junction of the cross body and the trunnion. The leg or tang of the secondary seal preferably is slightly spaced from the annular groove of the cup and the bottom of the ring of the secondary seal is spaced from the edge of the open end of the cup. This enables lubricant which is flushed out of the cup when the universal joint is lubricated to move past the primary seal and outwardly between the secondary seal and the cup.

In another form of the invention, the secondary seal is of generally inverted U-shaped configuration in transverse cross section. It has an annular groove with a cross bar or ring which engages the body of the cross between the two shoulders. The secondary seal is stationary relative to the cross body and the cups moves relative to the secondary seal. In this instance, the open end of the cup has an outwardly-extending annular tang or leg which is received in the annular groove of the secondary seal. Again, the secondary seal is slightly spaced from the cup to enable lubricant flushed past the primary seal to escape between the secondary seal and the cup. This embodiment is preferred for bearing cups having thin walls.

In a third form, the secondary seal is of generally inverted L-shaped configuration with a tang or leg extending downwardly and a thick cross bar or ring engaging the cross body between the two shoulders. The open end of the cup again has an annular tang or leg extending outwardly inside the secondary seal to provide an overlapping relationship. Again, the secondary seal and the cup are spaced apart to enable lubricant to escape. This design is simpler than the other two yet still provides a labyrinth protective seal.

It is, therefore, a principal object of the invention to provide a combination seal for a universal joint comprising a primary seal and a secondary seal spaced outwardly therefrom to protect the primary seal From contaminants.

Another object of the invention is to provide a combination seal for a universal joint including a primary seal and a secondary seal which is spaced from the primary seal and from the cup to enable lubricant to pass outwardly therebetween.

Many other objects and advantages of the invention will be apparent from the following detailed description of preferred embodiments thereof, reference being made to the accompanying drawings, in which:

FIG. 4 is a further enlarged, fragmentary view in transverse cross section of the combination universal joint seal of FIG. 3;

FIG. 5 is an enlarged, fragmentary view in transverse cross section of a modified combination universal joint seal; and FIG. 6 is an enlarged, fragmentary view in transverse cross section of another modified combination universal joint seal.

Figure 1:
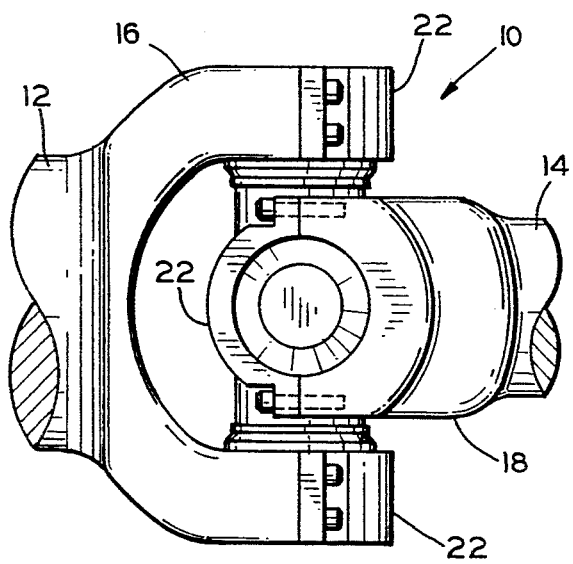
FIG. 1 is a somewhat schematic view in elevation of an assembled universal joint connecting two shafts and embodying the invention.
Figure 3:
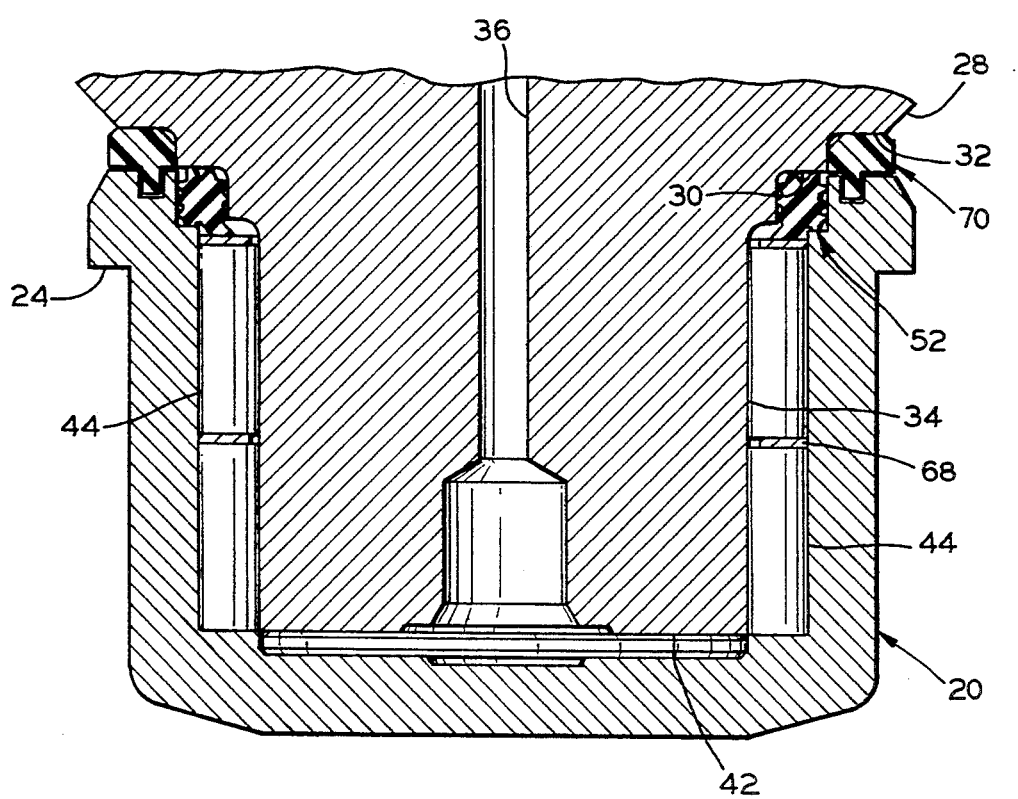
FIG. 3 is a greatly enlarged, fragmentary view in cross section of a trunnion of the universal joint cross, a bearing cup, and a combination seal according to the invention, in assembled relationship.

Referring to FIG. 1, a universal joint embodying the invention is indicated at 10 and connects driving and driven shafts 12 and 14 in the conventional manner. The joint includes two yokes 16 and 18 which are disposed at mutually perpendicular angles. Bearing cups 20 are held in cross holes in the arms of the yokes by suitable means such as retaining clamps or straps 22. The bearing cups have annular flanges 24 (FIG. 3) which locate the cups in predetermined positions relative to the yoke arms.

Figure 2:
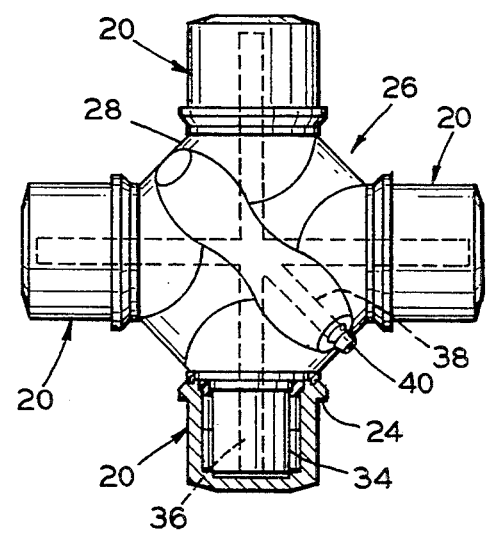
FIG. 2 is a view in elevation of a universal joint cross and bearing cups assembled therewith, with one bearing cup shown in section.

Referring to FIG. 2, a cross 26 of the universal joint includes a body 28 with first and second shoulders 30 and 32 (FIGS. 3 and 4) from which extend trunnions 34. The body 28 and the trunnions 34 are provided with lubrication passages 36 which communicate with a supply passage 38 and a lubricant to the end of the trunnion 34 which has a cross passage 42 (FIG. 3) to supply lubricant to two rows of needle bearings 44 located between the bearing cup 20 and the trunnions 34. With this arrangement, the needle bearings 44 can be lubricated periodically through the fitting 40 to minimize the possibility of the bearings drying out and the universal joint freezing.

Each of the bearing cups 20 has an open end to receive the trunnion 34 with the cup having a first cylindrical internal portion 46 (FIG. 4) of one diameter adjacent the open end and a second cylindrical internal portion 48 of smaller diameter away from the open end. An internal annular shoulder 50 is formed between the two portions 46 and 48 and faces the open end.

A primary universal joint seal 52 comprises a resilient sealing member or ring 54 made entirely of resilient material, preferably of a thermoplastic material or synthetic rubber. The member 54 has inwardly-extending circular lips 56 which engage a cylindrical surface 57 below the shoulder 30. The circular lips 56 are narrow and engage the surface 57 along narrow, annular areas to provide several seals between the sealing member 54 and the cross 26. The sealing member 54 also has outwardly extending circular lips 58 which engage the first cylindrical internal portion 46 of the bearing cup 20. These engage the surface along narrow, annular areas to provide seals between the sealing member 54 and the cup 20.

The sealing member 54 also has upwardly-extending narrow circular lips 60 between the inner multiple lips 56 and the outer multiple lips 58 which engage the first shoulder 30. The sealing member 54 also has a downwardly-extending narrow circular lip 62 between the inner multiple lips 56 and the outer multiple lips 58. The lip 62 engages the internal shoulder 50 of the bearing cup 20 along a narrow, annular area to provide an additional seal between the sealing member 54 and the cup 20. The lips 60 and 62, through their engagements with the cross body 28 and the shoulder 50, also retain the seal 52 in proper sealing position. The lips 56, 58, 60 and 62 thus provide narrow sealing areas with the surface 57 and the shoulder 30 and also with the cylindrical portion 46 and the shoulder 50 of the cup 20. The lips 56 and 60 primarily inhibit ingress of water and other contaminants into the cup 20 while the lips 58 and 62 primarily control the flow of lubricant out of the cup 20 when lubricant is supplied to the fitting 40.

The sealing member 54, in this instance, also has a longer, thicker, downwardly-extending lip 64 which engages a retaining ring 66 on top of the upper row of needle bearings 44 and urges them downwardly. A separator ring 68 is also located between the two rows of the bearings 44. The pressure of the thicker lip 64 tends to keep the needle bearings 44 in parallel relationship and from becoming skewed.

Even though the primary seal 52 is reasonably well protected from contaminants by the cup, nevertheless, contaminants such as dirt, dust, grime, and water do contact the seal 52 over a period of time. To prevent this, a secondary seal 70 in accordance with the invention is located around and spaced from the primary seal 52. Toward this purpose, the bearing cup 20 has a deep, narrow annular groove 71 located in the open end of the cup formed by an outer leg 72 and an inner leg 73. The secondary seal 70, which can be made of relatively hard plastic, is of generally T-shaped configuration in transverse cross section as shown in FIG. 4. It includes an annular tang or leg 74 which extends downwardly into the groove 71 and an upper, thicker ring or cross bar 76. The bar 76 has an inner cylindrical edge 78 which fits tightly with a cylindrical surface 80 of the cross body 28 between the shoulders 30 and 32 so that the secondary seal 70 is held stationary and in position relative to the cross body 28. The cross bar 76 also has an upper annular surface 82 which contacts the shoulder 32 to aid in holding the secondary seal in place along with the leg 74 in the groove 71 in overlapping relationship with the legs 72 and 73.

In the assembled relationship, the secondary seal 70 is spaced from the cup 20 to enable grease or lubricant flushed past the primary seal 52 to escape. Thus, the lower surface of the cross bar 76 is spaced from the end of the cup 20 and the leg 74 is thinner than the groove 71 so as to be spaced therefrom.

With the secondary seal 70 spaced outwardly and separately from the primary seal 52, the primary seal is free to float in its confined space and accommodate dimensional variations in the cross 26 and the cup 20. The secondary seal 70 provides complete protection for the primary seal 52 from contaminants and extends the effectiveness and the life of the primary seal.

Referring to FIG. 5, a bearing cup 84 has a thinner wall at its open end than the cup 20. The cup 84 has a groove (not shown) near the closed end and is mounted in a cross hole of a yoke arm with a snap ring in the groove, as is known in the art. The open end of the cup has an annular tang or leg 86 extending upwardly or outwardly therefrom and being structurally integral therewith. A secondary seal 88 has a thick cross bar or ring 90 with a groove 92 formed between legs 94 and 96. The leg 86 of the cup is received in the groove 92 in overlapping relationship with the legs 94 and 96. The cup and secondary seal are spaced slightly apart to enable escape of lubricant, as before.

Referring to FIG. 6, another secondary seal is shown. In this instance, a similar thin-walled cup 98 can be employed with a similar annular tang or leg 100 extending outwardly therefrom. A modified secondary seal 102, in this instance, has a thick cross bar or ring 104 with a single outer leg 106 extending in overlapping relationship with the leg 100. Again, the secondary seal 102 and the cup 98 are spaced apart to enable the escape of lubricant.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. In combination, a universal joint having a primary seal and a secondary seal, a cross, and a bearing cup, said cross having a body and a trunnion, said cross also having an annular shoulder and an adjacent surface of circular cross section at the juncture of said body and said trunnion on said cross, said adjacent surface being between said annular shoulder and said trunnion, said bearing cup having an open end and a closed end, said bearing cup having an end face near the open end, said trunnion being received in said bearing cup, the open end of said bearing cup having a leg thereon, said primary seal comprising a resilient sealing member having spaced lips engaging said bearing cup and said cross, said secondary seal being spaced outwardly from said primary seal away from said trunnion, said secondary seal having a ring and a leg extending therefrom in overlapping relationship with said bearing cup leg and juxtaposed with said bearing cup leg, said ring of said secondary seal having a tight fit with said adjacent surface so as to remain stationary relative to said cross, and a top of said ring engaging the shoulder of said cross, and a bottom of said ring juxtaposed with an end of said bearing cup leg.

2. The combination according to claim 1 wherein said secondary seal is spaced from said bearing cup to enable lubricant flushed past said primary seal to escape.

3. In combination, a universal joint having a primary seal and a secondary seal, a cross, and a bearing cup, said cross having a body and a trunnion, said cross also having a first and a secondary annular shoulder and a surface of circular cross section therebetween at the juncture of said body and said trunnion, said bearing cup having an open end and a closed end, said bearing cup having a first cylindrical internal portion of one diameter adjacent the open end and a second cylindrical internal portion of smaller diameter away from the open end with an internal annular shoulder formed between said two portions, the open end of said bearing cup having a leg thereon, said primary seal comprising a resilient sealing member having first circular lips engaging the surface of circular cross section of said cross, said resilient sealing member having second circular lips engaging said first internal portion adjacent the open end of said cup, said resilient sealing member having at least one lip engaging said first shoulder of said cross, and said resilient sealing member having an additional sealing lip engaging said internal annular shoulder of said bearing cup, said secondary seal being spaced outwardly from said primary seal away from said trunnion, said second seal having a ring and a leg extending therefrom in overlapping relationship with said bearing cup leg, the open end of said bearing cup having a second leg thereon spaced from said bearing cup leg and forming an annular groove therebetween, and said leg of said secondary seal extending into the groove between said bearing cup legs.

4. The combination according to claim 3 wherein said secondary seal is spaced from said bearing cup to enable lubricant flushed past said primary seal to escape.

5. The combination according to claim 3 wherein needle bearings are located between said trunnion and said bearing cup, a retaining ring is located at ends of said needle bearings toward the open end of said bearing cup, and said primary seal having a lid extending into contact with said retaining ring and urging said retaining ring and said needle bearings toward the closed end of said bearing cup.

6. The combination according to claim 5 wherein there are two rows of said needle bearings with a separator ring between said needle bearings in said two rows.

7. In combination, a universal joint having a primary seal and a secondary seal, a cross, and a bearing cup, said cross having a body and a trunnion, said cross having a first and a second annular shoulder and a cylindrical surface therebetween, said bearing cup having an open end and a closed end, said bearing cup having a first cylindrical internal portion of one diameter adjacent the open end and a second cylindrical internal portion of smaller diameter away from the open end with an internal annular shoulder formed between said two portions, the open end of said bearing cup having a leg thereon, said primary seal comprising a resilient sealing member having first circular lips engaging the cylindrical surface of said cross, said resilient sealing member having second circular lips engaging said first internal portion adjacent the open end of said bearing cup, said resilient sealing member having at least one lip engaging said first annular shoulder of said cross, and said resilient sealing member having an additional sealing lip engaging said internal annular shoulder of said bearing cup, said secondary seal being spaced outwardly from said primary seal away from said trunnion, said secondary seal having a ring and a leg extending therefrom in overlapping relationship with said bearing cup leg, said ring having an inner annular edge tightly engaging said cylindrical surface between said first and second annular shoulders to enable said secondary seal to remain stationary relative to said cross, with a top of said ring contacting said second annular shoulder of said cross, said secondary seal being spaced from said bearing cup to enable lubricant flushed past said primary seal to escape, the open end of said bearing cup having a second leg thereon spaced from said bearing cup leg and forming an annular groove therebetween, and said leg of said secondary seal extending into the groove between said bearing cup legs.

8. The combination according to claim 7 wherein said secondary seal is made of hard plastic material.

9. The combination according to claim 7 wherein needle bearings are located between said trunnion and said bearing cup, a retaining ring is located at ends of said needle bearings toward the open end of said bearing cup, and said primary seal having a lip extending into contact with said retaining ring and urging said retaining ring and said needle bearings toward the closed end of said bearing cup.

10. The combination according to claim 9 wherein there are two rows of said needle bearings with a separator ring between said needle bearings in said two rows.

11. In combination, a universal joint having a primary seal and a secondary seal, a cross and a bearing cup, said cross having a body and a trunnion, said cross also having an annular shoulder and an adjacent surface of circular cross section at the juncture of said body and said trunnion on said cross, said adjacent surface being between said annular shoulder and said trunnion, said bearing cup having an open end and a closed end, said trunnion being received in said bearing cup, the open end of said bearing cup having a leg thereon, said primary seal comprising a resilient sealing member having spaced lips engaging said bearing cup and said cross, said secondary seal being spaced outwardly from said primary seal away from said trunnion, said secondary seal having a ring and a leg extending therefrom in overlapping relationship with said bearing cup leg, said ring of said secondary seal having a tight fit with said adjacent surface so as to remain stationary relative to said cross, and a radial inner edge of said ring engaging said cross, the open end of said bearing cup having a second leg thereon spaced from said bearing cup leg and forming an annular groove therebetween, and said leg of said secondary seal extending into the groove between said bearing cup legs.

12. In combination, a universal joint having a primary seal and a secondary seal, a cross, and a bearing cup, said cross having a body and a trunnion, said cross also having an annular shoulder and an adjacent surface of circular cross section at the juncture of said body and said trunnion on said cross, said adjacent surface being between said shoulder and said trunnion, said bearing cup having an open end and a closed end, said trunnion being received in said bearing cup, the open end of said bearing cup having an end face with a leg thereon, said primary seal comprising a resilient sealing member having spaced lips engaging said bearing cup and said cross, said secondary seal being spaced outwardly from said primary seal away from said trunnion, said secondary seal having a ring and a first leg extending therefrom in overlapping relationship with said bearing cup leg, said ring of said secondary seal having a tight fit with said adjacent surface so as to remain stationary relative to said cross, and a radial inner edge of said ring engaging said cross, said secondary seal having a second leg extending therefrom spaced from said first leg and forming a groove therebetween, said leg of said bearing cup extending into said groove, with said ring being juxtaposed with said leg of said bearing cup.

13. In combination, a universal joint having a primary seal and a secondary seal, a cross, and a bearing cup, said cross having a body and a trunnion, said cross also having a first and a second annular shoulder and a surface of circular cross section therebetween at the juncture of said body and said trunnion, said bearing cup having an open end and a closed end, said bearing cup having a first cylindrical internal portion of one diameter adjacent the open end and a second cylindrical internal portion of smaller diameter away from the open end with an internal annular shoulder formed between said two portions, the open end of said bearing cup having an end face with a leg thereon, said primary seal comprising a resilient sealing member having first circular lips engaging the surface of circular cross section of said cross, said resilient sealing member having second circular lips engaging said first internal portion adjacent the open end of said bearing cup, said resilient sealing member having at least one lip engaging said first shoulder of said cross, and said resilient sealing member having an additional sealing lip engaging said internal annular shoulder of said bearing cup, said secondary seal being spaced outwardly from said primary seal away from said trunnion, said secondary seal having a ring and a first leg extending therefrom in overlapping relationship with said bearing cup leg, said secondary seal having a second leg extending therefrom spaced from said first leg and forming a groove therebetween, said leg of said bearing cup extending into said groove, in juxtaposed position with respect thereto.

14. In combination, a universal joint having a primary seal and a secondary seal, a cross, and a bearing cup, said cross having a body and a trunnion, said cross having a first and a second annular shoulder and a cylindrical surface therebetween, said bearing cup having an open end and a closed end, said bearing cup having a first cylindrical internal portion of one diameter adjacent the open end and a second cylindrical internal portion of smaller diameter away from the open end with an internal annular shoulder formed between said two portions, the open end of said bearing cup having an end face with a leg thereon, said primary seal comprising a resilient sealing member having first circular lips engaging the cylindrical surface of said cross, said resilient sealing member having second circular lips engaging said first internal portion adjacent the open end of said bearing cup, said resilient sealing member having at least one lip engaging said first annular shoulder of said cross, and said resilient sealing member having an additional sealing lip engaging said internal annular shoulder of said cup, said secondary seal being spaced outwardly from said primary seal away from said trunnion, said secondary seal having a ring and a first leg extending therefrom in overlapping relationship with said bearing cup leg, said ring having an inner annular edge tightly engaging said cylindrical surface between said first and second annular shoulders to enable said secondary seal to remain stationary relative to said cross, with a top of said ring contacting said second annular shoulder of said cross, said secondary seal being spaced from said bearing cup to enable lubricant flushed past said primary seal to escape, said secondary seal having a second leg extending therefrom spaced from said first leg and forming a groove therebetween, said leg of said bearing cup extending into said groove, in juxtaposed position with respect to said first leg and said second leg of said secondary seal.

* * * * *

UNITED STATES PATENT AND TRADEMARK OFFICE
CERTIFICATE OF CORRECTION

PATENT NO. : 5,407,387
DATED : April 18, 1995
INVENTOR(S) : Philip J. Mazziotti and Gary L. March It is certified that error appears in the above-identified patent and that said Letters Patent is hereby corrected as shown below:

Column 2, line 47, change "From" to --from--.

Column 6, line 5, claim 5, line 5, change "lid" to --lip--.

Signed and Sealed this

Twentieth Day of June, 1995

Attest:

BRUCE LEHMAN

Attesting Officer

Commissioner of Patents and Trademarks